(12) United States Patent
Asakawa

(10) Patent No.: US 9,599,858 B2
(45) Date of Patent: Mar. 21, 2017

(54) LIQUID CRYSTAL DISPLAY DEVICE

(71) Applicant: Japan Display Inc., Minato-ku (JP)

(72) Inventor: Youichi Asakawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 256 days.

(21) Appl. No.: 14/108,592

(22) Filed: Dec. 17, 2013

(65) Prior Publication Data

US 2014/0211141 A1 Jul. 31, 2014

(30) Foreign Application Priority Data

Jan. 30, 2013 (JP) ................. 2013-015706

(51) Int. Cl.
*G02F 1/1337* (2006.01)
*G02F 1/1343* (2006.01)

(52) U.S. Cl.
CPC ...... *G02F 1/1337* (2013.01); *G02F 1/134309* (2013.01); *G02F 1/134363* (2013.01); *G02F 2001/133738* (2013.01); *G02F 2001/134372* (2013.01)

(58) Field of Classification Search
CPC ..... G02F 1/136286; G02F 2001/13629; G02F 1/134363; G02F 1/133707
See application file for complete search history.

(56) References Cited

U.S. PATENT DOCUMENTS 6,469,765 B1 * 10/2002 Matsuyama ...... G02F 1/134363
349/141
2013/0100384 A1 * 4/2013 Asakawa ............. G02F 1/1335
349/96

FOREIGN PATENT DOCUMENTS

| JP | 2000-356786 A | 12/2000 |
|---|---|---|
| JP | 2007-086205 | 4/2007 |
| JP | 2008-20669 A | 1/2008 |

OTHER PUBLICATIONS

Office Action issued on Jan. 19, 2016 in Japanese Patent Application No. 2013-015706 with English translation.

* cited by examiner

*Primary Examiner* — Phu Vu
(74) *Attorney, Agent, or Firm* — Oblon, McClelland, Maier & Neustadt, L.L.P.

(57) ABSTRACT

According to one embodiment, a liquid crystal display device includes an array substrate including a common electrode, an insulation film disposed on the common electrode, and a pixel electrode disposed on the insulation film, opposed to the common electrode and provided with a slit, a counter-substrate disposed to be opposed to the array substrate, and a liquid crystal layer formed of a negative-type liquid crystal material held between the array substrate and the counter-substrate, wherein the liquid crystal layer includes liquid crystal molecules which are initially aligned at an angle of 10° to 45° to a direction which is perpendicular to a direction of extension of the slit.

14 Claims, 3 Drawing Sheets

LIQUID CRYSTAL DISPLAY DEVICE

CROSS-REFERENCE TO RELATED APPLICATIONS

This application is based upon and claims the benefit of priority from Japanese Patent Application No. 2013-015706, filed Jan. 30, 2013, the entire contents of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal display devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

DETAILED DESCRIPTION

Figure 1:
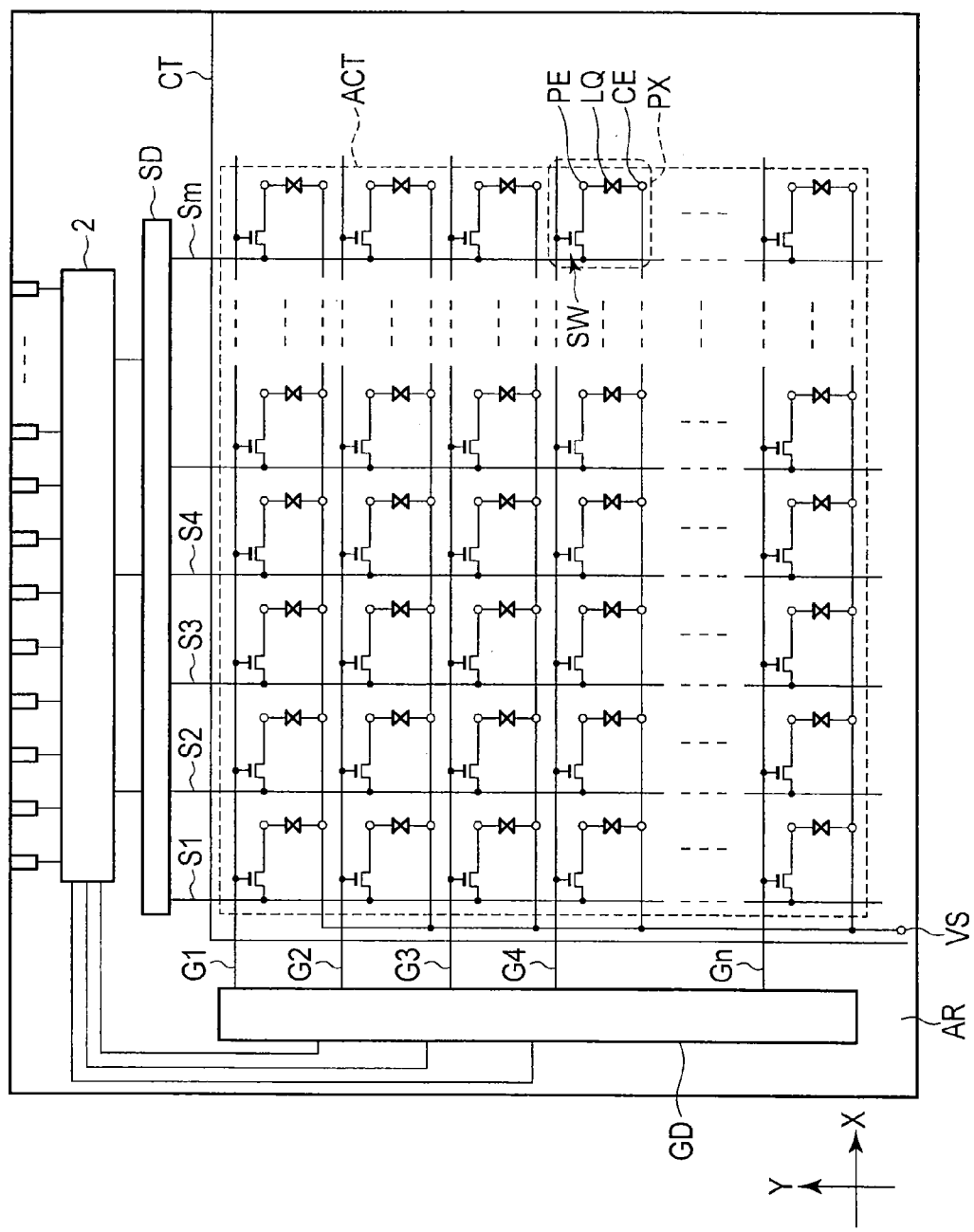
FIG. 1 is a view which schematically illustrates a structure and an equivalent circuit of a liquid crystal display device according to an embodiment.

In general, according to one embodiment, a liquid crystal display device includes an array substrate including a common electrode, an insulation film disposed on the common electrode, and a pixel electrode disposed on the insulation film, opposed to the common electrode and provided with a slit; a counter-substrate disposed to be opposed to the array substrate; and a liquid crystal layer formed of a negative-type liquid crystal material held between the array substrate and the counter-substrate, wherein the liquid crystal layer includes liquid crystal molecules which are initially aligned at an angle of 10° to 45° to a direction which is perpendicular to a direction of extension of the slit.

According to another embodiment, a liquid crystal display device includes an array substrate including a common electrode, an insulation film disposed on the common electrode, and a pixel electrode which is disposed on the insulation film, is opposed to the common electrode, and includes a plurality of electrode portions spaced apart by a slit; a counter-substrate disposed to be opposed to the array substrate; and a liquid crystal layer held between the array substrate and the counter-substrate, wherein the liquid crystal layer includes liquid crystal molecules which are initially aligned at an angle of 10° to 45° to a direction which is perpendicular to a direction of extension of the electrode portions.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, an n-number of gate lines G (G1 to Gn), and an m-number of source lines S (S1 to Sm). The gate lines G extends, for example, substantially linearly in a first direction X. The gate lines G are disposed in parallel in a second direction Y crossing the first direction X. In this example, the first direction X and the second direction Y are substantially perpendicular to each other. The source lines S cross the gate lines G. The source lines S extend substantially linearly in the second direction Y. It is not always necessary that each of the gate lines G and source lines S extend linearly, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE.

In the present embodiment, the liquid crystal display panel LPN is configured such that the pixel electrodes PE and common electrode CE are formed on the array substrate AR, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane or a substrate major surface which is defined by the first direction X and second direction Y (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE is disposed common to the pixel electrodes PE of plural pixels PX via an insulation layer. The pixel electrodes PE and common electrode CE are formed of, for example, a light-transmissive, electrically conductive material such as indium tin oxide (ITO) or indium zinc oxide (IZO), but may be formed of other metallic material such as aluminum.

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS.

Figure 2:
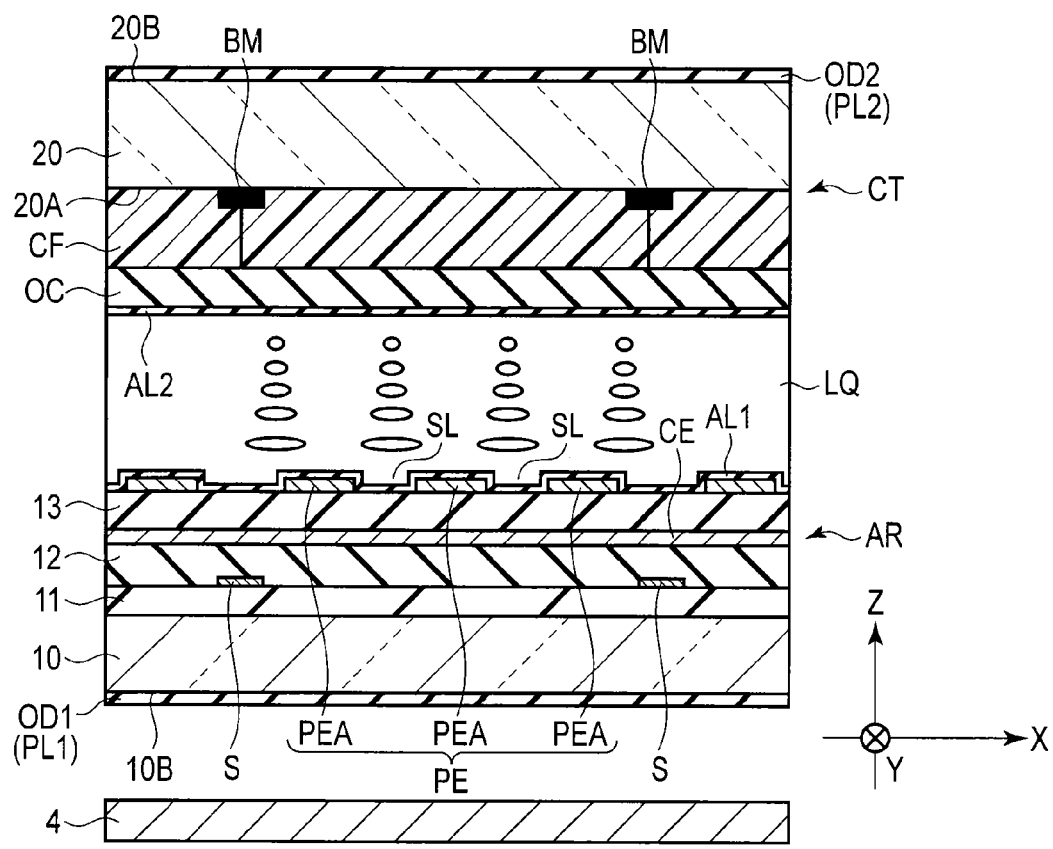
FIG. 2 is a view which schematically illustrates an example of a cross section of an active area of a liquid crystal display panel shown in FIG. 1.

FIG. 2 is a view which schematically illustrates an example of a cross section of the active area of the liquid crystal display panel shown in FIG. 1.

The array substrate AR is formed by using a first insulative substrate 10 having light transmissivity. Source lines S are formed on a first interlayer insulation film 11, and are covered with a second interlayer insulation film 12. The second interlayer insulation film 12 is a planarization film, and is a transparent organic insulation film in this embodiment. Gate lines and storage capacitance lines, which are not shown, are disposed, for example, between the first insulative substrate 10 and the first interlayer insulation film 11. A common electrode CE is formed on the second interlayer insulation film 12, and is covered with a third interlayer insulation film 13. Pixel electrodes PE are formed on the third interlayer insulation film 13. The pixel electrode PE includes slits SL which extend, for example, in the second direction Y, and a plurality of electrode portions PEA which are mutually spaced apart by the slits SL. The common electrode CE is opposed to plural pixel electrodes PE via the third interlayer insulation film 13.

A first alignment film AL1 is disposed on that surface of the array substrate AR, which is opposed to the counter-substrate CT, and the first alignment film AL1 extends over substantially the entirety of the active area ACT. The first alignment film AL1 covers the pixel electrodes PE, etc., and is also disposed on the third interlayer insulation film 13. The first alignment film AL1 is formed of a material which exhibits horizontal alignment properties.

The counter-substrate CT is formed by using a second insulative substrate 20 having light transmissivity. The counter-substrate CT includes a black matrix BM, a color filter CF, an overcoat layer OC, and a second alignment film AL2.

The black matrix BM partitions each pixel PX and forms an aperture portion AP which is opposed to the pixel electrode PE. Specifically, the black matrix BM is disposed so as to be opposed to wiring portions, such as the source lines S, gate lines, and switching elements. In this example, only those portions of the black matrix BM, which extend in the second direction Y, are illustrated, but the black matrix BM may include portions extending in the first direction X. The black matrix BM is disposed on an inner surface 20A of the second insulative substrate 20, which is opposed to the array substrate AR.

The color filter CF is disposed in association with each pixel PX. Specifically, the color filter CF is disposed in the aperture portion AP on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter CFR, which is formed of a resin material that is colored in red, is disposed in association with a red pixel. A blue color filter CFB, which is formed of a resin material that is colored in blue, is disposed in association with a blue pixel. A green color filter CFG, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surface of the color filters CF.

The second alignment film AL2 is disposed on that surface of the counter-substrate CT, which is opposed to the array substrate AR, and the second alignment film AL2 extends over substantially the entirety of the active area ACT. The second alignment film AL2 covers the overcoat layer OC, etc. The second alignment film AL2 is formed of a material which exhibits horizontal alignment properties.

The first alignment film AL1 and second alignment film AL2 are in contact with the liquid crystal layer LQ. The first alignment film AL1 and second alignment film AL2 are subjected to alignment treatment (e.g. rubbing treatment or optical alignment treatment) for initially aligning the liquid crystal molecules of the liquid crystal layer LQ in a predetermined direction.

In the meantime, a state in which no voltage is applied to the liquid crystal layer LQ, that is, a state (OFF time) in which no potential difference (or electric field) is produced between the pixel electrode PE and common electrode CE, corresponds to the initial alignment state, and the alignment direction of the liquid crystal molecule LM at the OFF time corresponds to the initial alignment direction.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap is created. The array substrate AR and counter-substrate CT are attached by a sealant (not shown) on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ is composed of, for example, a liquid crystal material having a negative (negative-type) dielectric constant anisotropy.

A first optical element OD1 is attached by, e.g. an adhesive to an outer surface of the array substrate AR, that is, an outer surface 10B of the first insulative substrate 10 which constitutes the array substrate AR. The first optical element OD1 is located on that side of the liquid crystal display panel LPN, which is opposed to backlight 4, and controls the polarization state of incident light which enters the liquid crystal display panel LPN from the backlight 4. The first optical element OD1 includes a first polarizer PL1 having a first polarization axis (or a first absorption axis).

A second optical element OD2 is attached by, e.g. an adhesive to an outer surface of the counter-substrate CT, that is, an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis (or a second absorption axis).

The first polarization axis of the first polarizer PL1 and the second polarization axis of the second polarizer PL2 have, for example, an orthogonal positional relationship (crossed Nicols). In this case, one of the polarizers is disposed, for example, such that the polarization axis thereof is parallel or perpendicular to the initial alignment direction of liquid crystal molecules, that is, a first alignment treatment direction or a second alignment treatment direction.

Figure 3:
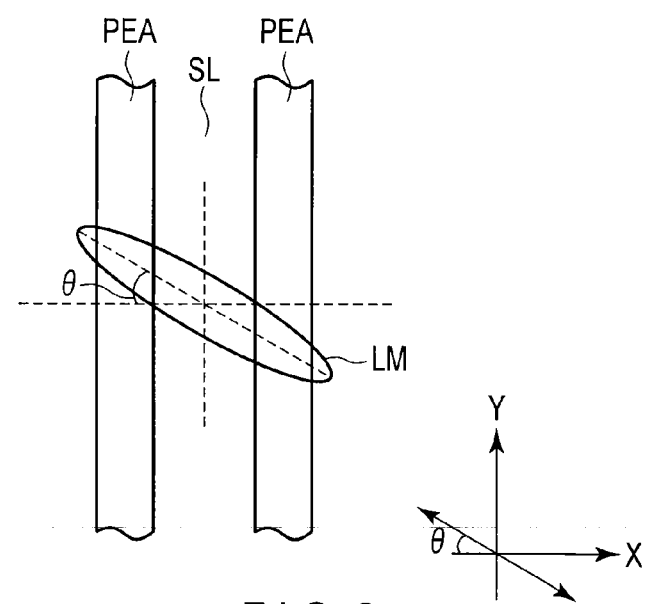
FIG. 3 is a view for explaining an example of the relationship between electrode portions of a pixel electrode, on one hand, and an initial alignment direction of a liquid crystal molecule.

FIG. 3 is a view for explaining an example of the relationship between electrode portions PEA of the pixel electrode PE, on one hand, and an initial alignment direction of a liquid crystal molecule LM.

The initial alignment direction of the liquid crystal molecule LM is a direction inclined to a direction which is substantially perpendicular to the direction of extension of the slits SL or the direction of extension of the electrode portions PEA. In the example illustrated, the direction of extension of the slits SL and electrode portions PEA is the second direction Y. An angle (bias angle) θ formed between the direction (first direction X), which is substantially perpendicular to the direction of extension of the slits SL or the direction of extension of the electrode portions PEA, and the initial alignment direction of the liquid crystal molecule LM, is set in a range of, for example, 10° to 45°. The bias angle θ is defined by the alignment treatment direction of the first alignment film AL1 and second alignment film AL2.

In the above-described liquid crystal display device, in a state in which no voltage is applied to the liquid crystal layer LQ, that is, in a state (OFF time) in which no potential difference (or electric field) is produced between the pixel electrode PE and common electrode CE, the liquid crystal molecule LM of the liquid crystal layer LQ is aligned such that the major axis thereof is positioned in the first alignment treatment direction of the first alignment film AL1 and the second alignment treatment direction of the second alignment film AL2. This OFF time corresponds to the initial alignment state, and the alignment direction of the liquid crystal molecule LM at the OFF time corresponds to the initial alignment direction.

Part of light from the backlight 4 passes through the first polarizer PL1, and enters the liquid crystal display panel LPN. The polarization state of the light, which has entered the liquid crystal display panel LPN, varies depending on the alignment state of the liquid crystal molecule LM when the light passes through the liquid crystal layer LQ. Thus, at the OFF time, the light, which has passed through the liquid crystal display panel LPN, is absorbed by the second polarizer PL2 (black display).

On the other hand, in a state in which a voltage is applied to the liquid crystal layer LQ, that is, in a state (ON time) in which a potential difference (or electric field) is produced between the pixel electrode PE and the common electrode CE, a lateral electric field (or oblique electric field) component, which is substantially parallel to the substrates, is produced between the pixel electrode PE and the common electrode CE. The liquid crystal molecule LM is affected by the electric field, and rotates in a plane which is substantially parallel to the X-Y plane.

At this ON time, part of light, which is incident on the liquid crystal display panel LPN from the backlight 4, passes through the first polarizer PL1 and enters the liquid crystal display panel LPN. The light, which has entered the liquid crystal display panel LPN, changes its polarization state. At this ON time, at least part of the light emerging from the liquid crystal layer LQ passes through the second polarizer PL2 (white display).

In this case, the bias angle θ is set at a predetermined angle in order to prevent the occurrence of a reverse domain in the liquid crystal layer LQ. In the case of a liquid crystal having a positive (positive-type) dielectric constant anisotropy, there is a tendency that the director of the liquid crystal molecule LM varies in the cell gap direction Z by a vertical electric field component occurring between the pixel electrode PE and the common electrode CE, and between the pixel electrode PE and common electrode CE, on one hand, and the counter-substrate CT, on the other hand. Thus, even when a predetermined bias angle is provided, if a high voltage is applied to the liquid crystal layer LQ or if a pressing force is applied from the outside, there is a possibility that the alignment of the liquid crystal molecule LM is disturbed and a reverse domain occurs. On the other hand, in the case of a liquid crystal display device which adopts a negative-type liquid crystal, the director of the liquid crystal molecule LM hardly varies in the cell gap direction Z by the vertical electric field component occurring between the pixel electrode PE and the common electrode CE. Thus, such a result was obtained that in the liquid crystal display device which adopts a negative-type liquid crystal, compared to the liquid crystal display device which adopts a positive-type liquid crystal, the occurrence of a reverse domain can be suppressed.

Specifically, in an FFS-mode liquid crystal display device which adopts a negative-type liquid crystal, compared to an FFS-mode liquid crystal display device which adopts a positive-type liquid crystal, there are a smaller number of liquid crystal molecules which are aligned in the cell gap direction Z (tilt angle) when a voltage is applied to the pixel electrode PE and common electrode CE. Thus, when the negative-type liquid crystal is adopted, a reverse domain hardly occurs even if the bias angle θ is small.

In the meantime, in the liquid crystal display device which adopts a positive-type liquid crystal, the bias angle θ is an angle of an initial alignment direction of liquid crystal molecules to the direction of extension of the slit of the pixel electrode.

However, as regards the negative-type liquid crystal, compared to the positive-type liquid crystal, it is difficult to compound a liquid crystal material with low viscosity. For example, such a tendency was observed that a response speed at a time of displaying an intermediate gradation under common conditions was slower when the negative-type liquid crystal was applied to the FFS-mode liquid crystal display device than when the positive-type liquid crystal was applied to the FFS-mode liquid crystal display device. This tendency is conspicuous when an intermediate gradation is displayed.

Taking the above into consideration, the inventor found that in the FFS-mode liquid crystal display device which adopts the negative-type liquid crystal, the response speed at a time of displaying an intermediate gradation can be improved by setting the bias angle θ at 10° or more.

In addition, the inventor found that in the FFS-mode liquid crystal display device which adopts the negative-type liquid crystal, compared to the FFS-mode liquid crystal display device which adopts the positive-type liquid crystal, the sensitivity to the film thickness of the alignment film is high, and non-uniformity in luminance tends to easily occur, but the occurrence of non-uniformity in luminance can be suppressed by setting the bias angle θ at 10° or more.

Figure 4:
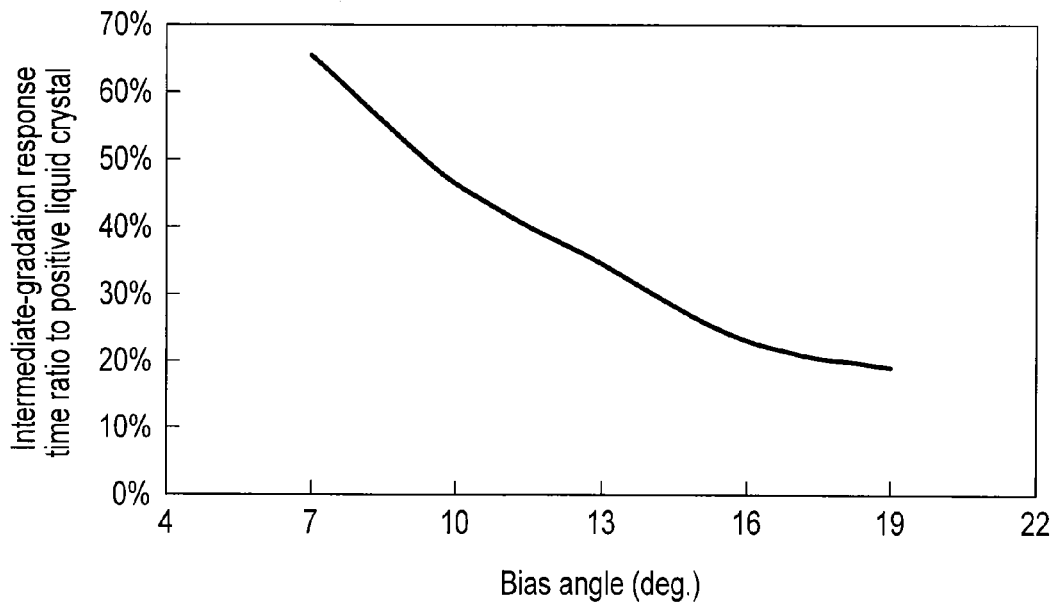
FIG. 4 is a view for explaining an example of the relationship between a bias angle and a response speed at a time of displaying an intermediate gradation.

FIG. 4 is a view for explaining an example of the relationship between the bias angle θ and a response speed of a liquid crystal at a time of displaying an intermediate gradation. In the meantime, the response speed of the liquid crystal is, for example, a time that is needed from the application of a predetermined voltage to the stabilization of the alignment state of liquid crystal molecules. In this example, a response time (the bias angle is fixed at a predetermined value) at a time of displaying an intermediate gradation in an FFS-mode liquid crystal display device, which adopts a positive-type liquid crystal, is used as a reference, and the response time is indicated by a response time ratio at a time of displaying an intermediate gradation in an FFS-mode liquid crystal display device which adopts a negative-type liquid crystal ((the response time at a time of adopting a negative-type liquid crystal—the response time at a time of adopting a positive-type liquid crystal (the bias angle is fixed at a predetermined value))/the response time at a time of adopting a positive-type liquid crystal (the bias angle is fixed at a predetermined value)).

In the FFS-mode liquid crystal display device which adopts the negative-type liquid crystal, when the bias angle θ was set at 10°, the response time was such that a sufficient display quality can be obtained, even when this display device was compared with the FFS-mode liquid crystal display device which adopts the positive-type liquid crystal. In the FFS-mode liquid crystal display device which adopts the negative-type liquid crystal, when the bias angle θ was set at, for example, 10° or more, the response time at a time of displaying an intermediate gradation became shorter as the bias angle θ became larger.

Specifically, according to the present embodiment, a liquid crystal display device, which can improve the response speed of the negative-type liquid crystal, as has been described above, and can suppress degradation in display quality, can be provided.

Figure 5:
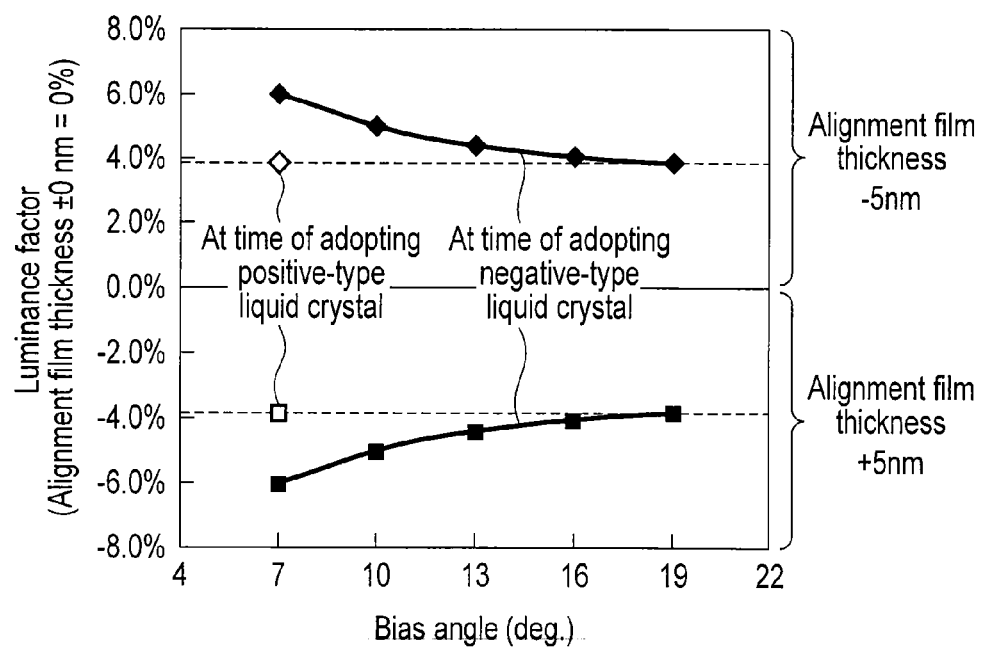
FIG. 5 is a view for explaining an example of a luminance factor at a time of varying a film thickness of an alignment film and a bias angle in the liquid crystal display device of the embodiment.

FIG. 5 is a view for explaining an example of a luminance factor at a time of varying the film thickness of the alignment film and the bias angle in the liquid crystal display device of the embodiment. In FIG. 5, a solid line indicates an example of the luminance factor of an FFS-mode liquid crystal display device which adopts a negative-type liquid crystal, and a broken line indicates an example of the luminance factor of an FFS-mode liquid crystal display device which adopts a positive-type liquid crystal. Incidentally, a luminance factor at a time when the variation amount of the thickness of the alignment film is ±0 nm, the luminance factor is set as a reference (luminance factor=0%), and the ratio of a varied luminance to this value is indicated on the ordinate as a luminance factor.

When the alignment film thickness is −5 nm, the luminance increases, compared to a time when the variation amount of the alignment film thickness is ±0 nm. When the alignment film thickness was set at −5 nm, the luminance factor of the FFS-mode liquid crystal display device, which adopts the negative-type liquid crystal, became smaller as the bias angle became larger. When the bias angle θ was set at 19°, the luminance factor of the FFS-mode liquid crystal display device, which adopts the negative-type liquid crystal, became substantially equal to the luminance factor of the FFS-mode liquid crystal display device, which adopts the positive-type liquid crystal.

When the alignment film thickness is +5 nm, the luminance decreases, compared to a time when the variation amount of the alignment film thickness is ±0 nm. When the alignment film thickness was set at +5 nm, the luminance factor of the FFS-mode liquid crystal display device, which adopts the negative-type liquid crystal, became greater as the bias angle θ became larger. When the bias angle θ was set at 19°, the luminance factor of the FFS-mode liquid crystal display device, which adopts the negative-type liquid crystal, became substantially equal to the luminance factor of the FFS-mode liquid crystal display device, which adopts the positive-type liquid crystal.

According to this result, as the bias angle θ becomes larger, the difference in luminance factor between the case where the negative-type liquid crystal is adopted and the case where the positive-type liquid crystal is adopted becomes smaller. When the bias angle θ was set at 19°, the luminance factor was substantially equal between the case where the negative-type liquid crystal was adopted and the case where the positive-type liquid crystal was adopted.

Specifically, as the bias angle θ was made larger, the sensitivity of the negative-type liquid crystal to the alignment film thickness was successfully made lower. Furthermore, by setting the bias angle θ at 10° or more, the sensitivity of the negative-type liquid crystal to the alignment film thickness can be made sufficiently low, and the occurrence of non-uniformity in display was successfully suppressed.

As has been described above, according to the present embodiment, a liquid crystal display device, which can suppress degradation in display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A liquid crystal display device comprising:
an array substrate including a common electrode, an insulation film disposed on the common electrode, a pixel electrode disposed on the insulation film, opposed to the common electrode and provided with a slit, and a first alignment film disposed on the pixel electrode;
a counter-substrate disposed to be opposed to the array substrate; and
a liquid crystal layer formed of a negative-type liquid crystal material held between the array substrate and the counter-substrate, wherein the liquid crystal layer includes liquid crystal molecules which are initially aligned at an angle of 10° to 45° to a direction which is perpendicular to a direction of extension of the slit, and a ratio of a varied luminance to a variation amount of a thickness of the first alignment film is less than or equal to 6.0%.

2. The liquid crystal display device of claim 1, wherein the first alignment film is in contact with the liquid crystal layer, the counter-substrate includes a second alignment film which is in contact with the liquid crystal layer, and the first alignment film and the second alignment film are subjected to alignment treatment in such a manner as to define an initial alignment direction of the liquid crystal molecules.

3. The liquid crystal display device of claim 1, wherein the array substrate further includes a gate line extending in a first direction and a source line extending in a second direction which is perpendicular to the first direction, and the slit extends in the second direction.

4. A liquid crystal display device comprising:

an array substrate including a common electrode, an insulation film disposed on the common electrode, a pixel electrode which is disposed on the insulation film, is opposed to the common electrode, and includes a plurality of electrode portions spaced apart by a slit, and a first alignment film disposed on the pixel electrode;

a counter-substrate disposed to be opposed to the array substrate; and a liquid crystal layer held between the array substrate and the counter-substrate, wherein the liquid crystal layer is composed of a liquid crystal material having a negative dielectric constant anisotropy, the liquid crystal layer includes liquid crystal molecules which are initially aligned at an angle of 10° to 45° to a direction which is perpendicular to a direction of extension of the electrode portions, and a ratio of a varied luminance to a variation amount of a thickness of the first alignment film is less than or equal to 6.0%.

5. The liquid crystal display device of claim 4, wherein the first alignment film is in contact with the liquid crystal layer, the counter-substrate includes a second alignment film which is in contact with the liquid crystal layer, and the first alignment film and the second alignment film are subjected to alignment treatment in such a manner as to define an initial alignment direction of the liquid crystal molecules.

6. The liquid crystal display device of claim 4, wherein the array substrate further includes a gate line extending in a first direction and a source line extending in a second direction which is perpendicular to the first direction, and the electrode portions extend in the second direction.

7. The liquid crystal display device of claim 2, wherein the first alignment film is in contact with the pixel electrode.

8. The liquid crystal display device of claim 7, wherein the counter-substrate further includes a color filter and an overcoat layer covering the color filter, and the second alignment film is in contact with the overcoat layer.

9. The liquid crystal display device of claim 3, wherein the common electrode is arranged directly below the pixel electrode and is arranged directly above the source line.

10. The liquid crystal display device of claim 1, wherein the angle is set in a range of 19° to 45°.

11. The liquid crystal display device of claim 5, wherein the first alignment film is in contact with the pixel electrode.

12. The liquid crystal display device of claim 11, wherein the counter-substrate further includes a color filter and an overcoat layer covering the color filter, and the second alignment film is in contact with the overcoat layer.

13. The liquid crystal display device of claim 6, wherein the common electrode is arranged directly below the pixel electrode and is arranged directly above the source line.

14. The liquid crystal display device of claim 4, wherein the angle is set in a range of 19° to 45°.

* * * * *